US010882641B2

(12) United States Patent
Li et al.

(10) Patent No.: US 10,882,641 B2
(45) Date of Patent: Jan. 5, 2021

(54) MULTIFUNCTIONAL STRUCTURE FOR ELECTRICAL ENERGY AND MECHANICAL ENVIRONMENT MANAGEMENT

(71) Applicant: NATIONAL UNIVERSITY OF DEFENSE TECHNOLOGY, Hunan (CN)

(72) Inventors: Dongxu Li, Hunan (CN); Changping Yin, Hunan (CN); Jun Wu, Hunan (CN); Dezhan Li, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 596 days.

(21) Appl. No.: 15/855,426

(22) Filed: Dec. 27, 2017

(65) Prior Publication Data

US 2018/0118379 A1    May 3, 2018

Related U.S. Application Data

(63) Continuation of application No. PCT/CN2016/000380, filed on Jul. 12, 2016.

(30) Foreign Application Priority Data

May 10, 2016  (CN) .......................... 2016 1 0307086

(51) Int. Cl.
*G06F 1/16*  (2006.01)
*H05K 5/00*  (2006.01)
(Continued)

(52) U.S. Cl.
CPC .............. *B64G 1/425* (2013.01); *B64G 1/10* (2013.01); *B64G 1/40* (2013.01); *B64G 1/50* (2013.01);
(Continued)

(58) Field of Classification Search
CPC .. G06F 1/16; B64G 1/425; B64G 1/42; B64G 1/50; B64G 1/66; B64G 1/46; F16F 7/104;
(Continued)

(56) References Cited

U.S. PATENT DOCUMENTS 6,472,098 B1 * 10/2002 Sawada ............... H01M 10/613
429/163
7,507,500 B2 * 3/2009 Donnelly .............. B60L 3/0046
429/99
(Continued)

FOREIGN PATENT DOCUMENTS

CN        103107299        5/2013
CN        103972441        8/2014
(Continued)

OTHER PUBLICATIONS

European Search Report issued in PCT/CN2016000380 dated Dec. 14, 2018.

*Primary Examiner* — Anthony M Haughton
(74) *Attorney, Agent, or Firm* — Workman Nydegger

(57) ABSTRACT

Provided is a multifunctional structure for electrical energy and mechanical environment management, which comprises a main structure module, four rechargeable/dischargeable power source modules (PSMs), a vibration reduction system and a sensor module. The main structure module includes a framework, an upper cover plate and a lower cover plate. Elastic blocks are arranged between the periphery of each PSM and walls of the square cavity used for accommodating the PSM. Elastic cushions are arranged between the bottom surface of each PSM and the lower cover plate, and between the top surface of each PSM and the upper cover plate. The multifunctional structure, by means of embedding the PSMs into the interior of the structure, can realize high integration of multiple functions, such as bearing, power supply and
(Continued)

vibration reduction, and can greatly improve the load/mass ratio, the load/volume ratio and the function/structure ratio of a system platform.

16 Claims, 13 Drawing Sheets

(51) Int. Cl.
| | | |
|---|---|---|
| H05K 7/00 | (2006.01) | |
| B64G 1/42 | (2006.01) | |
| H01M 10/052 | (2010.01) | |
| B64G 1/50 | (2006.01) | |
| F16F 7/104 | (2006.01) | |
| B64G 1/10 | (2006.01) | |
| B64G 1/40 | (2006.01) | |
| B64G 1/66 | (2006.01) | |
| H01M 2/10 | (2006.01) | |
| F16F 15/02 | (2006.01) | |
| B64G 1/22 | (2006.01) | |
| H01M 10/48 | (2006.01) | |

(52) U.S. Cl.
CPC ............... *B64G 1/66* (2013.01); *F16F 7/104* (2013.01); *H01M 2/1077* (2013.01); *H01M 2/1083* (2013.01); *H01M 10/052* (2013.01); *B64G 2001/1092* (2013.01); *B64G 2001/228* (2013.01); *F16F 15/02* (2013.01); *F16F 15/022* (2013.01); *H01M 10/482* (2013.01); *H01M 10/486* (2013.01); *H01M 2220/20* (2013.01); *Y02E 60/10* (2013.01)

(58) Field of Classification Search
CPC .......... F16F 7/10; H01M 2/10; H01M 2/1016; H01M 2/1077; H01M 2/1083
USPC .................................................... 361/679.01
See application file for complete search history.

(56) References Cited

U.S. PATENT DOCUMENTS

| | | | |
|---|---|---|---|
| 7,875,378 B2* | 1/2011 | Yang | G01R 31/364 429/61 |
| 8,212,522 B2* | 7/2012 | Deal | H01M 2/204 320/116 |
| 2006/0234119 A1 | 10/2006 | Kruger et al. | |
| 2008/0169788 A1 | 7/2008 | Bobbin et al. | |
| 2010/0104927 A1* | 4/2010 | Albright | B60L 50/64 429/50 |
| 2012/0164504 A1 | 6/2012 | Takashina et al. | |
| 2012/0265385 A1* | 10/2012 | Funada | H01M 10/0567 701/22 |
| 2013/0029192 A1* | 1/2013 | Oya | H01M 2/1072 429/61 |
| 2013/0260197 A1* | 10/2013 | Okada | H01M 2/1083 429/90 |
| 2013/0295419 A1 | 11/2013 | Kwon et al. | |
| 2014/0134462 A1* | 5/2014 | Choi | H01M 2/206 429/7 |
| 2014/0186686 A1* | 7/2014 | Takahashi | H01M 2/18 429/163 |
| 2015/0037649 A1* | 2/2015 | Wyatt | H01M 10/625 429/120 |
| 2015/0072188 A1* | 3/2015 | Dulle | H01M 10/425 429/61 |
| 2015/0263318 A1* | 9/2015 | Suzuki | H01M 2/1022 307/10.1 |

FOREIGN PATENT DOCUMENTS

| | | |
|---|---|---|
| CN | 103490024 | 9/2015 |
| CN | 204793006 | 11/2015 |
| CN | 204834785 | 12/2015 |
| CN | 105006533 | 7/2017 |
| CN | 105128644 | 8/2017 |
| DE | 4340007 | 6/1994 |
| JP | 2013206619 | 10/2013 |

* cited by examiner

MULTIFUNCTIONAL STRUCTURE FOR ELECTRICAL ENERGY AND MECHANICAL ENVIRONMENT MANAGEMENT

CROSS-REFERENCES TO RELATED APPLICATIONS

The application is a continuation application of a PCT application No. PCT/CN2016/000380, filed on Jul. 12, 2016; and claims the priority of Chinese Patent Application No. CN201610307086.1, filed to the State Intellectual Property Office of China (SIPO) on May 10, 2016, the entire content of which are incorporated hereby by reference.

TECHNICAL FIELD

The present disclosure relates to a multifunctional structure for electrical energy and mechanical environment management.

BACKGROUND

Multifunctional structure technology urgently need to be developed for modern spacecraft structures, which organically combines independent functional units of electricity, heat, propelling, vibration reduction, thermal protection, etc. and the system structural platform, to realize the integration of the structure, functions, electricity energy, materials and the like, and thereby eliminate a great amount of redundant weight and volume of traditional structures, realize a light weight and volume miniaturization, and consequently increase the load/mass ratio and the function/structure ratio of system platform, decrease research and development cost, prolong the service life of spacecraft, and improve the performance of spacecraft. However, no relevant literature has been reported so far.

SUMMARY

For defects of an existing art, the present disclosure provides a multifunctional structure for electrical energy and mechanical environment management, so as to effectively solve the above problems.

The present disclosure adopts a technical solution as follows.

The present disclosure provides a multifunctional structure for electrical energy and mechanical environment management, including a main structure module, four rechargeable/dischargeable power source modules, a vibration reduction system and a sensor module.

The main structure module includes a framework, an upper cover plate and a lower cover plate. The framework has an overall appearance of square shape with four square cavities arranged in two rows and two columns; the framework is in all-around symmetry about a first axis, a second axis and a third axis; the framework is sandwiched between the upper cover plate and the lower cover plate so as to seal the four square cavities. The framework, the upper cover plate and the lower cover plate form a main force bearing structure having a structure bearing function.

Each of the four rechargeable/dischargeable power source modules is individually arranged in a respective one of the four square cavities in an embedding manner by virtue of an elastic support; and each of four rechargeable/dischargeable power source modules is electrically connected to a first electrical connector arranged on an outer side wall of the framework via a positive wire and a negative wire of the each of four rechargeable/dischargeable power source modules.

The elastic support includes an elastic block arranged between a periphery of the rechargeable/dischargeable power source module and a wall of the respective square cavity accommodating the rechargeable/dischargeable power source module, a first elastic cushion arranged between a top surface of the rechargeable/dischargeable power source module and the upper cover plate, and a second elastic cushion arranged between a bottom surface of the rechargeable/dischargeable power source module and the lower plate.

The elastic block, the first elastic cushion and the second elastic cushion form the vibration reduction system which is a spring-vibrator vibration reduction system. The elastic block, the first elastic cushion and the second elastic cushion form the elastic support with rigidity and damping. Each of the four rechargeable/dischargeable power source modules is equivalent to a vibrator with mass; the vibration reduction system absorbs vibration energy by virtue of a deformation of the elastic support, and consumes the vibration energy by a manner that the rechargeable/dischargeable power source module serving as the vibrator converts the vibration energy into kinetic energy of the vibrator.

The sensor module includes a first temperature sensor and a second temperature sensor for monitoring the temperature of the power supply modules, a first acceleration sensor for measuring a vibration condition of the framework, a second acceleration sensor for measuring a vibration condition of the upper cover plate and a third acceleration sensor for measuring a vibration condition of the lower cover plate. The first temperature sensor is arranged in an inner cavity of the rechargeable/dischargeable power source module; the second temperature sensor is arranged on outer side wall of the rechargeable/dischargeable power source module; the first acceleration sensor is arranged on an inner wall of the framework; the second acceleration sensor is arranged on an inner wall of the upper cover plate and the third acceleration sensor is arranged on an inner wall of the lower cover plate.

Optionally, the framework is formed by connecting and assembling a first hollow square pipe and a second hollow square pipe, the first hollow square pipe includes eight rims disposed on the periphery and the second hollow square pipe includes four keels.

The four keels are connected through a cross-shaped connector to form a cross structure.

Every two of the eight rims are connected through an L-shaped connector to form an L-shaped structure firstly such that four L-shaped structures are obtained.

The four L-shaped structures are combined with the cross structure formed by the four keels by virtue of T-shaped connectors to form the framework.

Optionally, the four keels and the eight rims are respectively formed by layup carbon fiber composite material, and a layup pattern is [±45/0/±45]2s.

The cross-shaped connector, the L-shaped connectors and the T-shaped connectors are respectively made of titanium alloy material; and the eight rims and the four keels are bonded by adhesive.

Optionally, each corner of the framework is bonded with an L-shaped angular piece by a structural adhesive, and the angular piece is made of polyimide insulation material and used for reinforcing assembled junctions of the framework; and an insulation piece is bonded at an installation position of each of the first acceleration sensor, the second acceleration sensor and the third acceleration sensor, and the insulation piece is made of polyimide insulation material.

Optionally, each of the upper cover plate and the lower cover plate includes an upper skin, a sandwiched plate and a lower skin arranged from top to bottom, and the sandwiched plate is sandwiched between the upper skin and the lower skin; the upper skin is bonded to the sandwiched plate by a first adhesive layer, a thickness of the first adhesive layer is controlled in a range from 0.1 mm to 0.2 mm; the lower skin is bonded to the sandwiched plate by a second adhesive layer, a thickness of the second adhesive layer is controlled in a range from 0.1 mm to 0.2 mm.

The sandwiched plate is in a rib-grid form, the upper skin and the lower skin are respectively in a panel form, and the upper skin and the lower skin are completely identical in structural dimensions and materials.

The upper skin, the sandwiched plate and the lower skin are respectively made of carbon fiber composite material, and a layup pattern for the upper skin and the lower skin is [0/±45/90/±45]s; and a layup pattern for the sandwiched plate is [0/±45/90/0]2s.

Optionally, each of the upper skin and the lower skin is provided with a plurality of circular exhaust holes which are regularly distributed and serve as gas discharging passages.

The lower cover plate is fixed on the bottom surface of the framework in an adhesive manner; the upper cover plate is fixed on the top surface of the framework by virtue of screws through threaded connection, and screw installation holes are disposed at four angular points and a central position of the framework and on the rims and keels; and the screws are made of titanium alloy materials with a predetermined heat expansion coefficient.

Optionally, the elastic blocks, the first elastic cushions and the second elastic cushions are made of macromolecular elastic material, i.e., vinyl-terminated polydimethylsiloxane, and a chemical molecular formula of the material is:

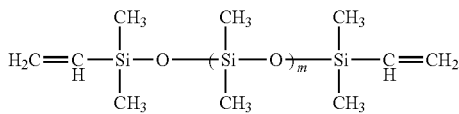

The elastic blocks, the first elastic cushions and the second elastic cushions are configured to structurally support the four rechargeable/dischargeable power source modules, consume the vibration energy by virtue of deformation, protect the four rechargeable/dischargeable power source modules, enable the four rechargeable/dischargeable power source modules to be insulated from the main structure module and dissipate the heat of the four rechargeable/dischargeable power source modules.

Optionally, the elastic block, the first elastic cushion and the second elastic cushion are installed by pre-pressing, and the four rechargeable/dischargeable power source modules are elastically constrained and supported by virtue of an elastic force produced by the pre-pressing; the elastic block is in a cuboid shape; two ends of the elastic block are respectively connected with an inner side surface of the framework and an outer side surface of the power supply module in a surface contact manner but are not fixed connected to the inner side surface of the framework and the outer side surface of the power supply module; each of the first elastic cushion and the second elastic cushion is in parallel crosses; one surface of the first elastic cushion is bonded with the lower surface of the upper cover plate through adhesive, another surface of the first elastic cushion is connected with the top surface of the power supply module in a surface contact manner but not fixed connected to the top surface of the power supply module; one surface of the second elastic cushion is bonded with the upper surface of the lower cover plate through adhesive, another surface of the second elastic cushion is connected with the bottom surface of the power supply module in a surface contact manner but not fixed connected to the bottom surface of the power supply module; each of the elastic block, the first elastic cushion and the second elastic cushion is in a pre-pressed state once installed, such that each of the four power supply modules is at a predetermined position inside the framework when the each of the four power supply modules is in a stationary state.

Optionally, at an inner side of the framework, each elastic block is adhered with a first limiting block at a first root boundary at a first side of the elastic block by a first structural adhesive and a second limiting block at a second root boundary at a second side of the elastic block by a second structural adhesive, the first limiting block and the second limiting block are configured to prevent the elastic block from moving and dislocating.

Optionally, each of the four rechargeable/dischargeable power source modules includes a lithium battery.

A plurality of voltage detection wires are led out from each of the four rechargeable/dischargeable power source modules and welded on a second electrical connector installed on the outer side wall of the framework to form a detection interface for detecting a grading voltage signal of the each of the four rechargeable/dischargeable power source modules.

Both the upper surface of the upper cover plate and the lower surface of the lower cover plate are polished, so that a carbon fiber surface of the multifunctional structure is consistent in conductivity;

A copper frame is laid and pasted on the upper surface of the upper cover plate; a bottom copper foil is laid and pasted on the lower surface of the lower cover plate, and the bottom copper foil is formed by splicing a plurality of copper foils with a first width so as to form an integral conducting surface; U-shaped copper foils are uniformly laid and pasted on the outer side wall of the framework, and the U-shaped copper foils are connected with the copper frame on the upper cover plate and the bottom copper foil on the lower cover plate, so that the multifunctional structure is consistent in conductivity.

A grounding pile is installed at each of four corners of the copper frame; one end of the grounding pile is connected with a ground wire of a respective power supply module, and the other end of the grounding pile is connected with an external ground, the multifunctional structure is integrally and effectively grounded via the grounding pile.

The multifunctional structure for electrical energy and mechanical environment management provided by the prevent disclosure has the following advantages.

(1) In the present disclosure, the power supply modules are embedded inside the structure in an elastic constraint manner, so that the structure highly integrates multiple functions such as load bearing, power supply, vibration reduction and the like. Further, the structure adopts various light-weight materials such as the carbon fiber composite material and the like as well as the hollow framework structure, thereby effectively reducing the structure weight. Furthermore, since a space originally occupied by a power supply is saved, an available space for the effective load is increased. Therefore, the present disclosure greatly increases the load/mass ratio, load/volume ratio and function/structure ratio of the system platform.

(2) By designing the vibration reduction such as the elastic support and the like, the multifunctional structure for electrical energy and mechanical environment management of the present disclosure enables a rocket to survive in a strict vibration mechanical environment of a rising section, and can meet the demands of aerospace applications. Meanwhile, by material selection, structural design of the exhaust holes and the like, the multifunctional structure for electrical energy and mechanical environment management of the present disclosure enables the rocket to endure a heat vacuum environment, a heat circulating environment and the like and to be suitable for a space vacuum working environment.

DETAILED DESCRIPTION

In order to make technical problems to be solved by the present invention, the technical solution and beneficial effects more clear, the present disclosure is further described below in detail in combination with accompanying drawings and embodiments. It should be understood that specific embodiments described herein are only used for explaining the present disclosure rather than limiting the present disclosure.

With respect to the demands on the structural light weight and volume miniaturization, considering requirements for structural vibration reduction and charging/discharging, the present disclosure provides a multifunctional structure for electrical energy and mechanical environment management integrating a load bearing function, a vibration reduction function, a power supply and storage function and a measuring function.

With reference to FIG. 1 to FIG. 23, the multifunctional structure for electrical energy and mechanical environment management provided by the present disclosure includes a main structure module, four rechargeable/dischargeable power source modules, a vibration reduction system and a sensor module, and can withstand a broadband random vibration with a frequency range of 0 to 2000 Hz and a general root-mean-square acceleration of 28 g, a shock load reaching up to 1600 g and an acceleration load about 10 g.

All portions are described in detail as follows:

(I) Main Structure Module

The main structure module includes a framework 10, an upper cover plate 11 and a lower cover plate 12. The lower cover plate 12 is fixed to a bottom surface of the framework 10. In at least one embodiment, the lower cover plate 12 is fixed to the bottom surface of the framework 10 by adhesive. The upper cover plate 11 is fixed to a top surface of the framework 10. In at least one embodiment, the upper cover plate 11 is fixed to the top surface of the framework 10 through screws in a threading manner. Screw installation holes are disposed at four corner points and a central position of the framework 10 as well as on rims and keels. The screws are made of titanium alloy material with a small heat expansion coefficient and are suitable for a working environment with great temperature variation and violent change. The framework 10, the upper cover plate 11 and the lower cover plate 12 form a main force bearing structure having a structure bearing function.

(1) Framework

Figure 1:
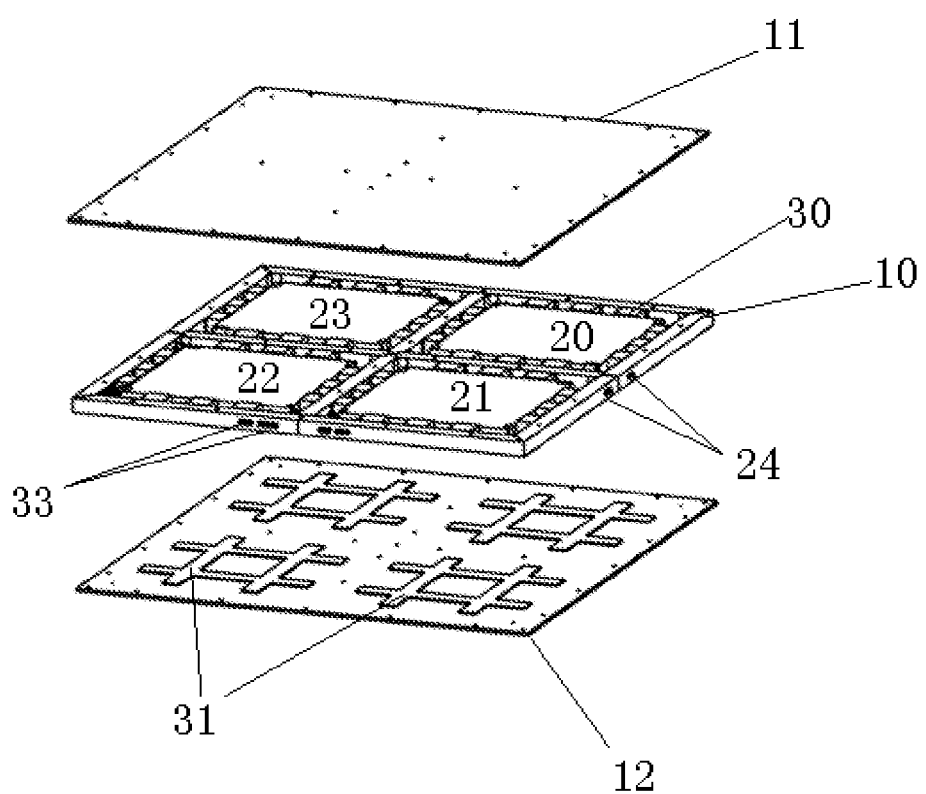
FIG. 1 is an exploded schematic diagram illustrating a multifunctional structure for electrical energy and mechanical environment management provided by the present disclosure.
Figure 2:
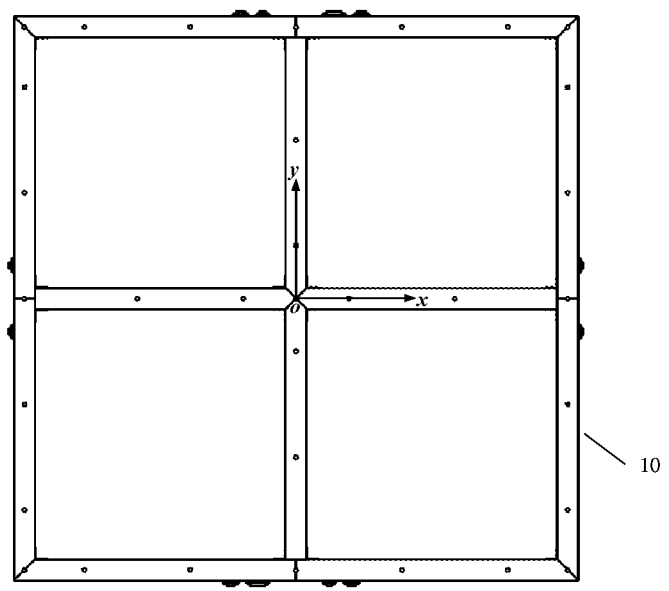
FIG. 2 is a front view illustrating a framework provided by the present disclosure.
Figure 3:
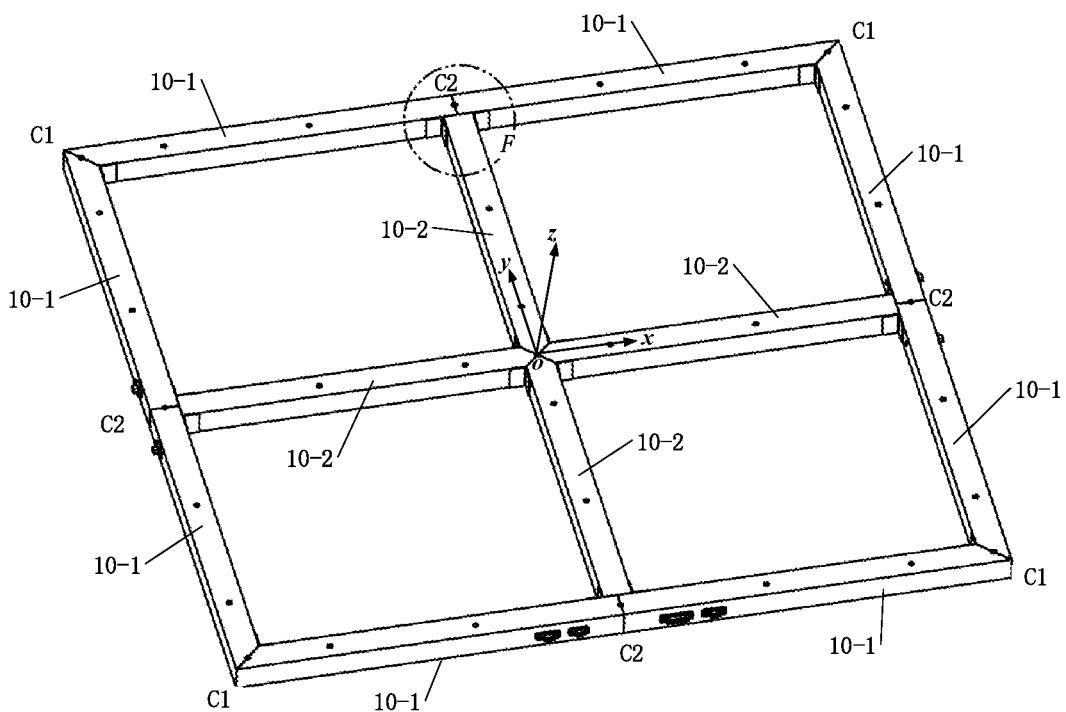
FIG. 3 is a perspective diagram illustrating a framework provided by the present disclosure.

The framework 10 has an overall appearance of square shape with four square cavities arranged in two rows and two columns. The framework 10 is in all-around symmetry about an axis x, an axis y and an axis z. A definition of a coordinate system o-xyz is shown in FIG. 2 and FIG. 3; the axis x and the axis y are in an o-xy plane in which the framework 10 is disposed, and the axis z is perpendicular to the o-xy plane and forms a right-hand coordinate system together with the axis x and the axis y.

The framework 10 is formed by connecting and assembling two types of hollow square pipes which are eight rims 10-1 disposed on the periphery and four keels 10-2 disposed at the center. The four keels 10-2 form a cross structure through a cross-shaped connector. The eight rims 10-1 are rim I to rim VIII, and every two rims are firmly connected through an L-shaped connector to form an L-shaped structure, thereby obtaining four L-shaped structures; and then the four L-shaped structures are combined with the cross-shaped structure formed by the four keels through T-shaped connectors to form the symmetric framework having an overall appearance of square shape with four square cavities arranged in two rows and two columns.

Additionally, the two types of square pipes, i.e. the keels 10-2 and the rims 10-1 are respectively formed by layup carbon fiber composite material, and a layup is $[\pm 45/0/\pm 45]_{2S}$. The cross-shaped connector, the L-shaped connector and the T-shaped connector are made of titanium alloy material with high specific strength and low heat expansion coefficient; and the cross-shaped connector, the L-shaped connector and the T-shaped connector are bonded with the rims 10-1 and the keels 10-2 by virtue of adhesive.

L-shaped angular pieces 10-3 are bonded at eight corners of the framework 10 respectively by virtue of the structural adhesive, and each angular piece 10-3 is made of polyimide insulation material and used for reinforcing the assembled junction of the framework 10 and also has an insulation effect.

(2) Upper/Lower Cover Plate

Both the upper cover plate 11 and the lower cover plate 12 adopt a sandwiched structural form formed by an upper skin/a sandwiched plate/a lower skin.

The sandwiched structural form refers to successively including an upper skin 11-1, a sandwiched plate 11-2 and a lower skin 11-3 from top to bottom. The upper skin 11-1 is connected with the sandwiched plate 11-2 by an adhesive layer, and a thickness of the adhesive layer is within a range of 0.1 mm to 0.2 mm. The lower skin 11-3 is connected with the sandwiched plate 11-2 by another adhesive layer, and a thickness of the another adhesive layer is within a range of 0.1 mm to 0.2 mm.

The sandwiched plate 11-2 is in a rib-grid form, the upper skin 11-1 and the lower skin 11-3 are in a panel form, and the upper skin 11-1 and the lower skin 11-3 are identical in structural dimensions and materials.

Additionally, the upper skin 11-1, the sandwiched plate 11-2 and the lower skin 11-3 are respectively made of carbon fiber composite material, and a layup manner of the upper skin 11-1 and the lower skin 11-3 is $[0/\pm 45/90/\pm 45]_s$; and a layup manner of the sandwiched plate 11-2 is $[0/\pm 45/90/0]_{2S}$.

Each of the upper cover plate 11 and the lower cover plate 12 is provided with a plurality of circular exhaust holes which are regularly distributed, and the plurality of circular exhaust holes are used as discharging passages for gas inside the structure in a process flow and vacuum environment.

(II) Rechargeable/Dischargeable Power Source Modules

The number of the power supply modules is four and the power supply module may adopt a lithium battery. In at least one embodiment, the power supply module may adopt a solid lithium battery. The four power supply modules are respectively marked as a power supply module I 20, a power supply module II 21, a power supply module III 22 and a power supply module IV 23. Each power supply module is arranged in a sealed square cavity formed by the framework 10, the upper cover plate 11 and the lower cover plate 12 in an embedding manner by virtue of an elastic support. Moreover, only one power supply module is installed in each square cavity. The elastic support includes an elastic block 30 and an elastic cushion 31. Optionally, a positive wire and a negative wire of the power supply module are led out by virtue of a cable and connected to an electrical connector 24 arranged on the outer side wall of the framework 10 to form a charging/discharging interface. The power supply module has a repeated charging/discharging function, and also has a function of acting as a vibrator to consume the vibration energy.

A plurality of voltage detection wires are also led out of the interiors of the power supply modules and welded on another electrical connector 33 installed on another outer side wall of the framework 10 to form a detection interface for detecting a grading voltage signal of each power supply module.

The power supply module may be further connected with an external power supply management unit, and can realize constant-current charging/discharging or constant-voltage charging/discharging, and the charging/discharging speed is controllable, so that the management of the electrical energy is effectively realized.

(III) Vibration Reduction System

In addition, the elastic block 30 is arranged between the periphery of each power supply module and the square cavity wall for accommodating the power supply module. The elastic cushion 31 is arranged between the bottom surface of each power supply module and the lower cover plate 12. Another elastic cushion 31 is arranged between the top surface of each power supply module and the upper cover plate 11. The power supply modules, the elastic blocks 30 and the elastic cushions 31 form a "spring-vibrator" type vibration reduction system. The elastic blocks 30 and the elastic cushions 31 are equivalent to the elastic support with certain rigidity and damping; and the power supply module is equivalent to a vibrator with certain mass. On one hand, the vibration reduction system absorbs the vibration energy through the deformation of the elastic support; and on the other hand, the structural vibration energy is converted by the power supply modules serving as the vibrators into the kinetic energy of the vibrators so as to consume the vibration energy. The comprehensive effect of the two aspects reduces the vibration transferring in the multifunctional structure, and a mechanical environment of the power supply modules is effectively managed.

Materials of the elastic blocks 30 and the elastic cushions 31 are materials prepared from a macromolecular elastic material, i.e., vinyl-terminated polydimethylsiloxane, and a chemical molecular formula of the material is:

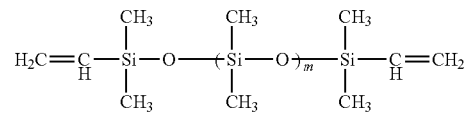

The elastic blocks 30 and the elastic cushions 31 not only have a function of structurally supporting the power supply modules, but also play a role in dissipating partial vibration energy by virtue of self elastic deformation, have a function of protecting the power supply modules, and also have a function of insulating the power supply modules and dissipating heat of the power supply modules.

The elastic block 30 is in a cuboid shape. Two ends of the elastic block are respectively connected with the inner side surface of the framework 10 and the outer side surface of the power supply modules in a surface contact manner; and no fixed connection relationship exists. Each elastic cushion 31 is in parallel crosses shape. One surface of the elastic cushion 31 is bonded with the lower surface of the upper cover plate 11 through adhesive and another surface is connected with the surface of the power supply module only in a surface contact manner, and no fixed connection relationship exists. One surface of another elastic cushion 31 is bonded with the upper surface of the lower cover plate 12 through adhesive, and another surface is connected with the surface of the power supply module only in a surface contact manner, and no fixed connection relationship exists. The installed elastic block 30 and the elastic cushions 31 are in a pre-pressed state, have a structure supporting effect, and can enable the power supply module to be fixed in a predetermined position inside the framework 10 when the power supply module is in a stationary state.

At an inner side of the framework 10, each elastic block is adhered with limiting blocks in positions of root boundaries at both sides of the elastic block by structural adhesive. The limiting blocks are configured to limit the elastic block so as to prevent the elastic block from moving and dislocating.

(IV) Sensor Module

The sensor module includes a plurality of temperature sensors and a plurality of acceleration sensors. The temperature sensors are arranged in inner cavities and on outer side walls of the power supply modules respectively, and used for monitoring the temperature of the power supply modules. The acceleration sensors are arranged on the inner wall of the framework 10, the inner wall of the upper cover plate 11 and the inner wall of the lower cover plate 12 respectively and used for measuring the vibration condition of the framework 10, the vibration condition of the upper cover plate 11 and the vibration condition of the lower cover plate 12, thereby providing a detection and monitoring means for the electrical energy and vibration management inside the multifunctional structure.

In addition, in the present disclosure, a copper frame 50 is laid and pasted on the upper surface of the upper cover plate 11; four corners of the copper frame are each connected to a grounding pile 53. One end of the grounding pile 53 is connected with a ground wire of the power supply module, and the other end is connected with an external ground such as system structural ground of a spacecraft. A bottom copper foil 51 is laid and pasted on the entire lower surface of the lower cover plate 12; and U-shaped copper foils 52 are uniformly laid and pasted on the outer side walls of the framework 10, and the U-shaped copper foils 52 are connected with the copper frame 50 and the bottom copper foil 51.

By adopting the above technical solution, a multifunctional structure for electrical energy and mechanical environment management integrating functions such as load bearing, vibration reduction, power supply and storage, measurement and the like is formed.

The present disclosure has the following innovation points:

(1) In the present disclosure, the power supply modules are embedded inside the structure in an elastic constraint manner, so that the structure highly integrates multiple functions such as load bearing, power supply, vibration reduction and the like. Further, the structure adopts various light-weight materials such as the carbon fiber composite material and the like as well as the hollow framework structure, thereby effectively reducing the structure weight. Furthermore, since a space originally occupied by a power supply is saved, an available space for the effective load is increased. Therefore, the present disclosure greatly increases the load/mass ratio, load/volume ratio and function/structure ratio of the system platform.

(2) By designing the vibration reduction such as the elastic support and the like, the multifunctional structure for electrical energy and mechanical environment management of the present disclosure enables a rocket to survive in a strict vibration mechanical environment of a rising section, and can meet the demands of aerospace applications. Meanwhile, by material selection, structural design of the exhaust holes and the like, the multifunctional structure for electrical energy and mechanical environment management of the present disclosure enables the rocket to endure a heat vacuum environment, a heat circulating environment and the like and to be suitable for a space vacuum working environment.

The multifunctional structure for electrical energy and mechanical environment management provided by the present disclosure has multiple functions such as load bearing, vibration reduction, power supply, power storage, data measurement and the like and has shock and vibration resistant capacity when applied to a spacecraft.

The multifunctional structure is described below in detail in combination with an assembling process flow.

Step 1: Assembling a Framework.

The integral appearance and structure of the framework are shown in FIG. 2 and FIG. 3. The framework is made by connecting and assembling hollow pipes formed by layup an M40J/TDE-86 carbon fiber composite material. The sizes of an outer section of the square pipe are 30 mm×25 mm, and the wall thickness is 2.5 mm. An exemplary layup way is shown in the following table 1. According to the structural form, the square pipes forming the framework can be classified into two types, i.e. rims disposed on the periphery and keels disposed at the center.

Figure 4:
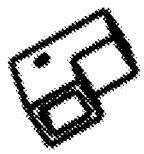
FIG. 4 is a schematic diagram illustrating a structure of an L-shaped connector provided by the present disclosure.
Figure 5:
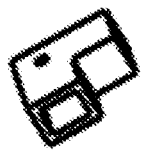
FIG. 5 is a schematic diagram illustrating a structure of a cross-shaped connector provided by the present disclosure.
Figure 6:
FIG. 6 is a schematic diagram illustrating a structure of a T-shaped connector provided by the present disclosure.

The rims and the keels are bonded by structural adhesive (J133) on the connectors thereof to obtain the framework. An exemplary combination sequence is as follows. Four keels are designed in total, and the four keels are connected through the cross-shaped connector to form a cross structure. Eight rims are designed in total and respectively named as rim I to rim VIII. Every two rims are connected through the L-shaped connector such that four L-shaped structures are formed; and then the four L-shaped structures are combined with the cross structure formed by the four keels through the T-shaped connectors to form a symmetric framework having an overall appearance of square shape with four square cavities arranged in two rows and two columns. Outer enveloping sizes of the framework are 800 mm×800 mm×25 mm. The shapes of the L-shaped connector, the cross-shaped connector and the T-shaped connector are respectively as shown in FIG. 4 to FIG. 6.

Figure 7:
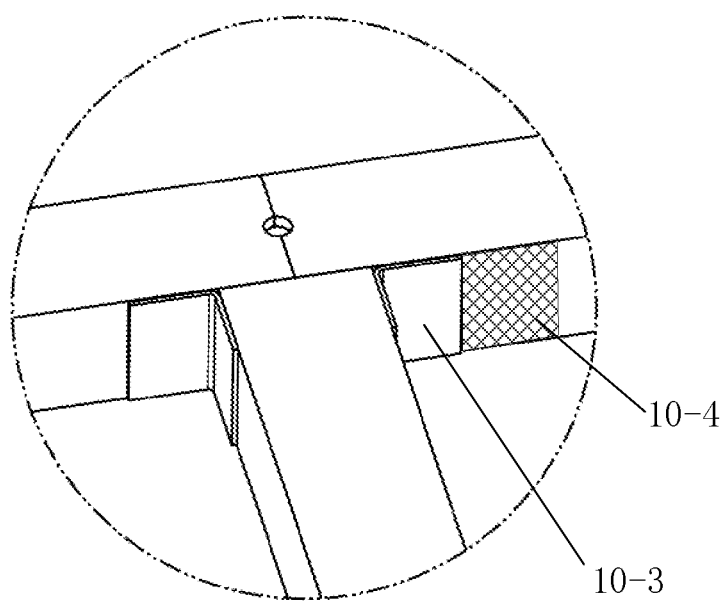
FIG. 7 is a partial enlarged view illustrating a region F in FIG. 3.

In order to reinforce the connections of the framework, eight L-shaped angular pieces are respectively adhered at eight corners of the framework by utilizing a structural adhesive (J133), and the thickness of each L-shaped angular piece is 1 mm, as shown in FIG. 7.

TABLE 1

Material and layup manner of framework

| Components | Material | Layup manner |
|---|---|---|
| Rims | M40J/TDE-86 carbon fibers | Thickness of a single layer of prepreg 0.125 mm [±45/0/±45]$_{2S}$ |
| Keels | M40J/TDE-86 carbon fibers | Thickness of a single layer of prepreg 0.125 mm [±45/0/±45]$_{2S}$ |
| Connectors | TC-4R titanium alloy | / |
| Angular piece | M40J/E648 carbon fibers | Thickness of a single layer of prepreg 0.125 mm [0/±45/90]$_S$ |
| Adhesive | J133 | / |

Step 2: Producing an Upper Cover Plate and a Lower Cover Plate.

Figure 8:
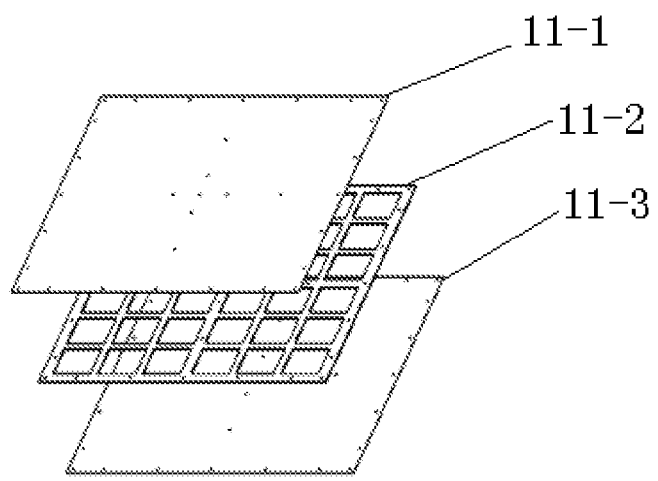
FIG. 8 is an exploded schematic diagram illustrating an upper cover plate or a lower cover plate in an angle provided by the present disclosure.
Figure 9:
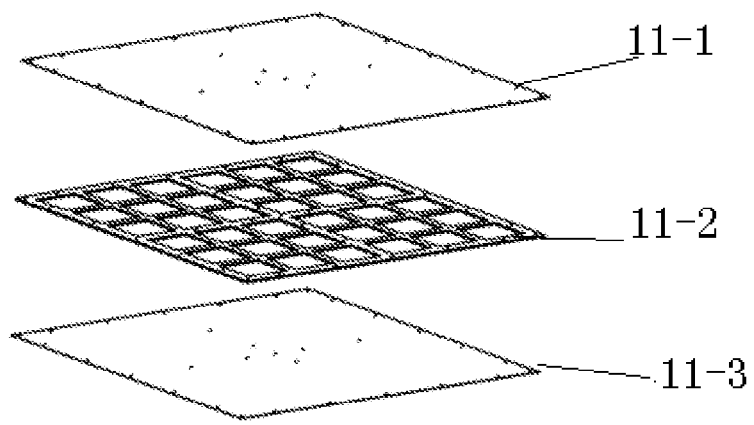
FIG. 9 is an exploded schematic diagram illustrating an upper cover plate or a lower cover plate in another angle provided by the present disclosure.

The upper cover plate and the lower cover plate are completely same in production materials, structure size and layup ways. The outer enveloping sizes of the upper cover plate and the lower cover plate are respectively 800 mm×800 mm×5 mm. Both the upper cover plate and the lower cover plate adopt a sandwiched structure formed by "an upper skin/a sandwiched plate/a lower skin". Both the thickness of the upper skin and the thickness of the lower skin are 0.96 mm. The sandwiched plate is in a composite material ribbed structural form, and the thickness thereof is 3 mm. As shown in FIG. 8 and FIG. 9. The upper skin/the sandwiched plate/the lower skin are connected in adhesive layers. In order to strictly control the thickness (kept in the range of 0.1 mm to 0.2 mm) of the adhesive layer, a J47 adhesive film is employed as adhesive. The material, the thickness of each layer and the layup way of the upper/lower cover plate are exemplarily shown in the following Table 2.

TABLE 2

Material and layup of upper/lower cover plate

| Components | Material | Thickness/mm | Layup manner |
|---|---|---|---|
| Upper skin | M40J/E648 carbon fibers | 1 | Single layer of prepreg 0.08 mm [0/±45/90/±45]$_S$ |
| Sandwiched plate | M40J/E648 carbon fibers | 3 | Single layer of prepreg 0.15 mm [0/±45/90/0]$_{2S}$ |
| Lower skin | M40J/E648 carbon fibers | 1 | Single layer of prepreg 0.08 mm [0/±45/90/±45]$_S$ |
| Adhesive layer | J47 adhesive film | 0.1 to 0.2 | / |

After the upper cover plate and the lower cover plate are formed, circular exhaust holes which are regularly distributed are formed in the surfaces of the upper cover plate and the lower cover plate.

Step 3: Bonding the Lower Cover Plate and the Framework.

The lower cover plate and the framework in step 1 are bonded together by virtue of J133 structural adhesive to form an integral structure.

Step 4: Bonding the Lower Cover Plate and a First Elastic Cushion by Virtue of Adhesive.

Figure 10:
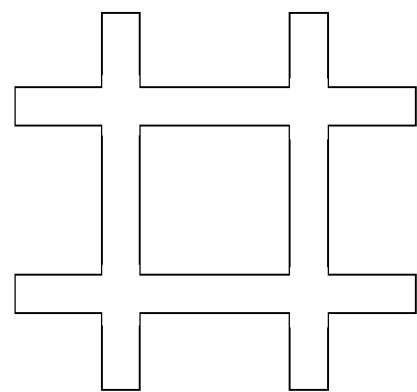
FIG. 10 is a schematic diagram illustrating a structure of an elastic cushion provided by the present disclosure.

The first elastic cushion is made of a K216 silicone rubber material, and has an appearance of parallel-crosses shape as shown in FIG. 10. The material, structure sizes and performance parameters of the first elastic cushion are shown in Table 3.

TABLE 3

Relevant parameters of the first elastic cushion

| Components | Material system | Hardness/A | Appearance sizes/mm | Thickness/mm |
|---|---|---|---|---|
| Elastic cushion | K216 silicone rubber | 35 to 40 | parallel crosses shape, and the outer enveloping sizes are 300 × 300 | 2.5 |

Four first elastic cushions are successively bonded onto the lower cover plate by adopting J133 adhesive.

Step 5: Installing Power Supply Modules.

The multifunctional structure totally includes four power supply modules which are respectively marked as the power supply modules I, II, III and IV. In order to ensure the reliability, in the present embodiment, two adjacent power supply modules are connected in series to obtain two groups of power supplies having a same output voltage, and the two power supplies are respectively referred to as a main power supply and a backup power supply. In one or more embodiment, 3 or 4 power supply modules are connected in series, thereby obtaining different output DC voltages.

Figure 11:
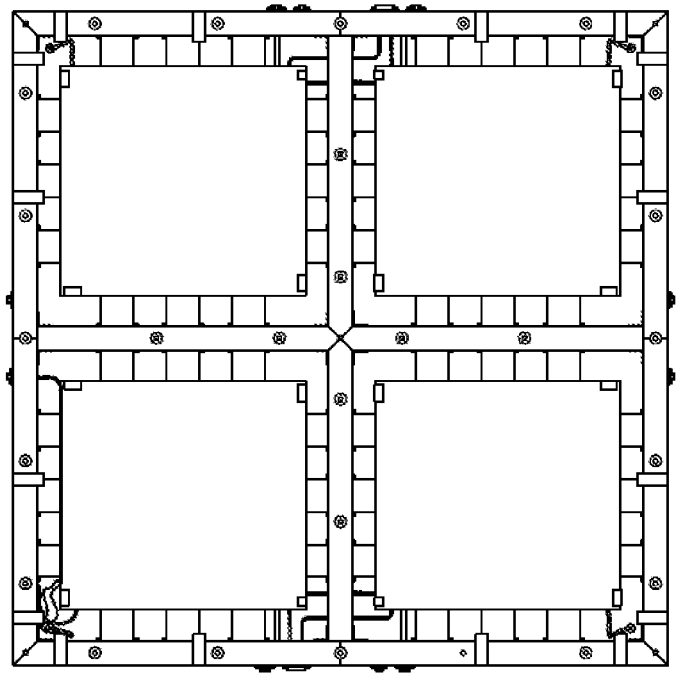
FIG. 11 is a front view illustrating an assembled state of power supply modules provided by the present disclosure.
Figure 12:
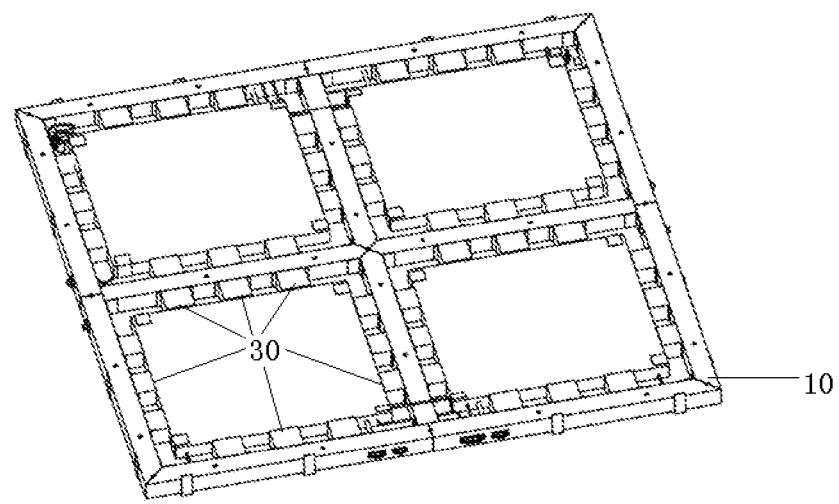
FIG. 12 is a perspective diagram illustrating an assembled state of power supply modules provided by the present disclosure.

The outer enveloping sizes of each power supply module are 300 mm×280 mm×20 mm, and an overall appearance of each power supply module is as shown in FIG. 11 and FIG. 12. Then the four power supply modules are installed in four square cavities formed by the framework having an overall appearance of square shape with four square cavities arranged in two rows and two columns and the cover plates. The lower bottom surface of each power supply module is connected with the first elastic cushion in a surface contact manner. A general schematic diagram illustrating the four power supply modules installed on the framework is shown in FIG. 12.

A positive wire and a negative wire of the main/backup power supply are led out from the side surface thereof in a slotting manner and respectively connected to a five-core electrical connector through a C55/0812-18 cable (in the present embodiment, the five-core electrical connector with a model specification of MM-2F2-005-P13-2200-ZLP produced by Airbo Company is employed), and the electrical connector is arranged on the outer side wall of the framework to form a charging/discharging interface of the main/backup power supply.

A group of voltage detection wires is led out from the interiors of the power supply modules and used for detecting the grading voltage signal of each power supply module. The voltage detection wires are welded to a 15-core electrical connector after being connected through a cable (in the present embodiment, the 15-core electrical connector with a model specification of J30JHT15TJSAN01 produced by Guizhou Aerospace Electric Appliance Company is employed), and this electrical connector is also installed on the outer side wall of the framework.

Step 6: Installing Elastic Blocks.

Figure 13:
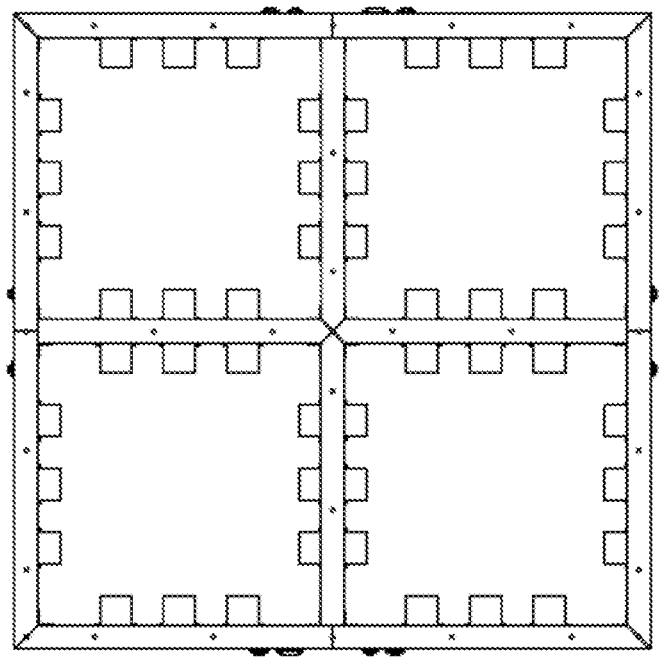
FIG. 13 is a front view illustrating an assembled state of elastic blocks provided by the present disclosure.
Figure 14:
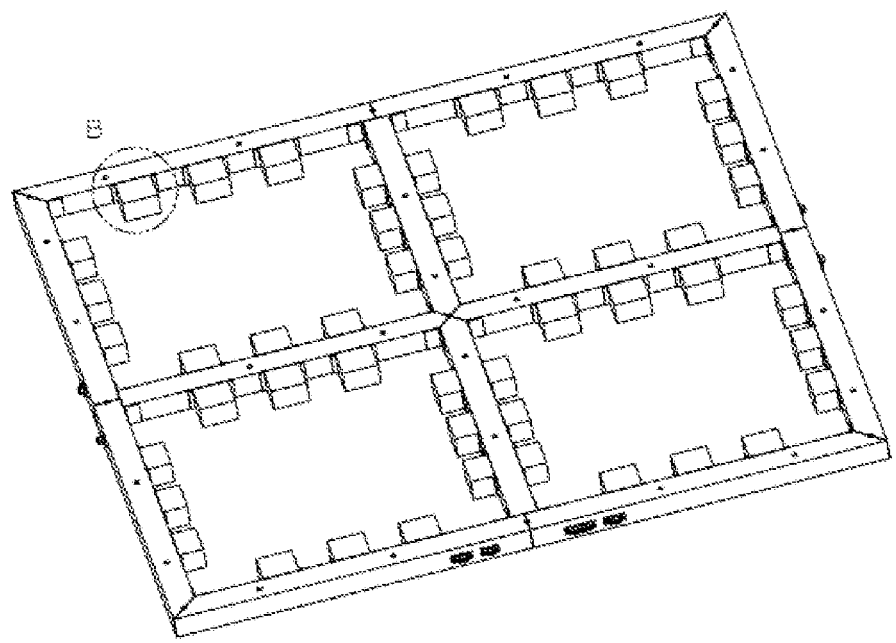
FIG. 14 is a perspective diagram illustrating an assembled state of elastic blocks provided by the present disclosure.
Figure 15:
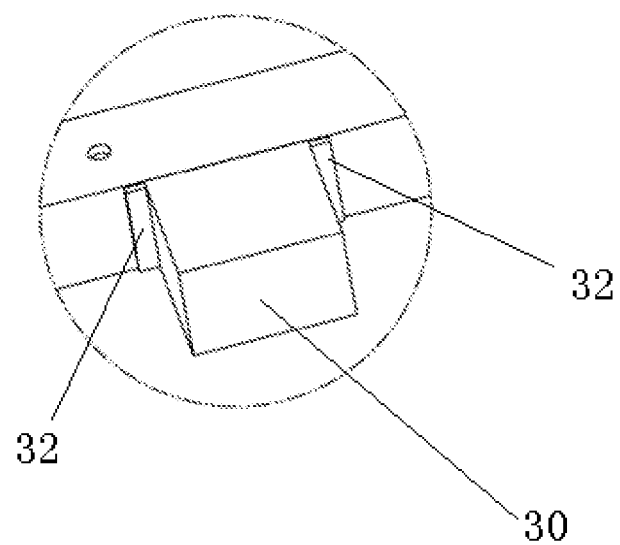
FIG. 15 is a partial enlarged view illustrating a region B in FIG. 14.

Like the elastic cushion, the elastic block is also made of the K216 silicone rubber material. The elastic block is in a cuboid shape, and the structure of the elastic block is shown in FIG. 13 and FIG. 15. The material, structural sizes and performance parameters of the elastic block are shown in Table 4.

TABLE 4

Relevant parameters of the elastic block

| Components | Material system | Hardness/A | Appearance sizes/mm | Thickness/mm |
|---|---|---|---|---|
| Elastic block | K216 silicone rubber | 35 to 40 | Rectangular shape, 39 × 40 | 24 |

Four side surfaces of each power supply module are respectively connected with the framework in a surface contact manner through the elastic blocks, and the rims or keels of each framework are connected with the power supply module by three parallel elastic blocks, so that 3×4×4=48 elastic blocks are needed in total, and the elastic blocks have no fixed connection relationship with the power supply modules and the frameworks.

The inner side, corresponding to the positions (the specific positions are as shown in FIG. 15) of root boundaries at two sides of the elastic block, of the framework are bonded with 96 limiting blocks through structure adhesive J133 (the root portion of each elastic block is provided with two limiting blocks, and 2×3×4×4=96 limiting blocks are needed in total), as shown in FIG. 15. The limiting blocks are made of T300/E648 fiber fabric laminated layup material, the dimension is 10 mm×5 mm×2 mm, and the limiting blocks are used for limiting the elastic blocks.

The elastic block is in a pre-pressed state after being installed, and the power supply modules cannot move inside the framework.

Figure 16:
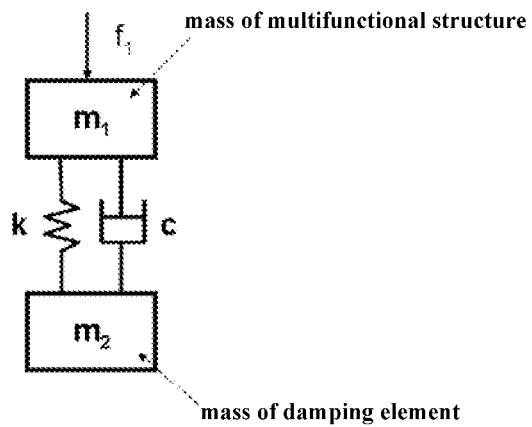
FIG. 16 is a schematic diagram illustrating an equivalent vibration reduction model provided by the present disclosure.

The power supply modules are connected with the main force bearing structure through the elastic blocks and the elastic cushions to form a vibration reduction system. The vibration reduction module has two functions. One function is managing a mechanical environment of the internal power supply modules so as to protect the power supply modules. The other function is that the vibration energy is consumed through the deformation of the elastic material, and the transferring of the vibration in the structure is reduced. The vibration reduction principle is shown in FIG. 16. The power supply module in the present disclosure is equivalent to a damping element in FIG. 16, i.e. a vibrator with a mass of $m_2$, while the elastic support is equivalent to a spring with a rigidity of k and a damper with a damping coefficient of c.

The transferring characteristics of the system can be expressed as the following formula:

$$H(\omega) = [Z(\omega)]^{-1} = \frac{\begin{pmatrix} k - \omega^2 m_2 & k \\ k & k - \omega^2 m_1 \end{pmatrix}}{|z|} \quad (1)$$

In the formula, $m_1$ denotes a mass of the multifunctional structure for electrical energy and mechanical environment management, $\omega$ denotes a vibration intrinsic angular frequency.

Under the motivation of an external dynamic load $f_1$, the output of the structure is as follows:

$$X_1 = \frac{k - \omega^2 m_2}{|Z|} \quad (2)$$

Therefore, by appropriately selecting the mass $m_2$ of the damping element and the rigidity k of the elastic support, letting $k - \omega^2 m_2 \to 0$, then the vibration of the structure is $x_1 \to 0$, $x_2 \neq 0$, i.e. the vibration is born by the damping element, and the vibration is reduced through the damping characteristics of the damping element.

Step 7: Bonding Sensors.

Figure 17:
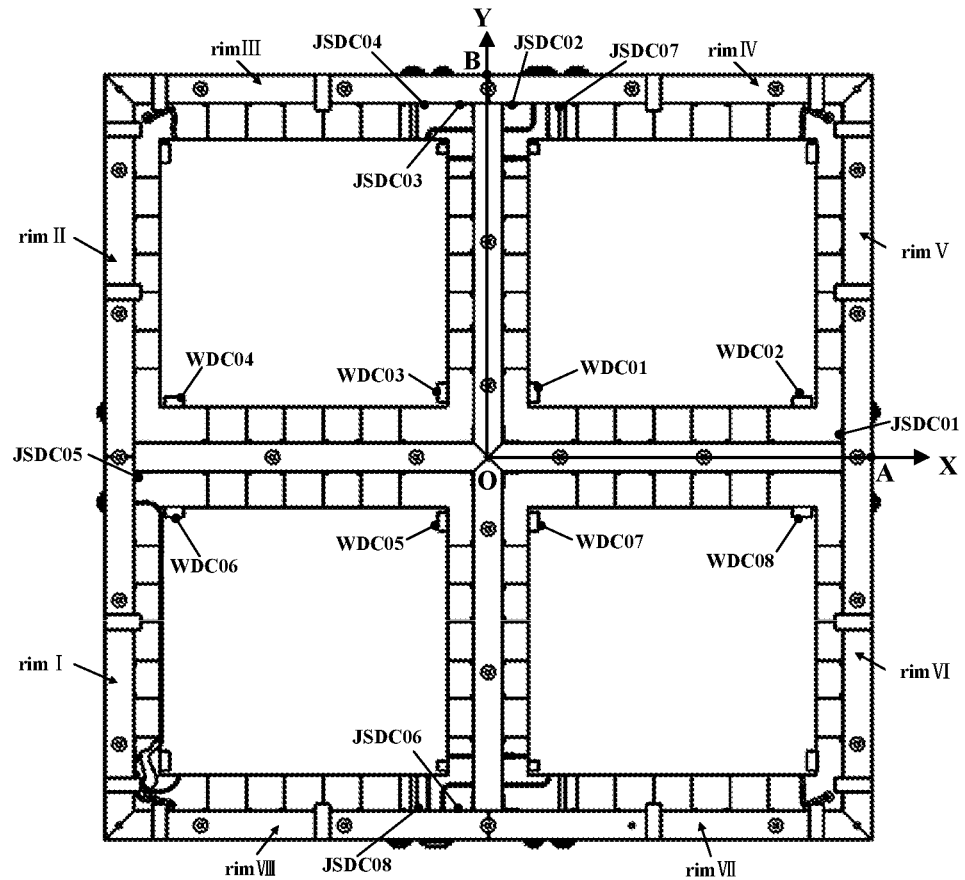
FIG. 17 is a schematic diagram illustrating installation positions of temperature sensors and acceleration sensors provided by the present disclosure, wherein WDC denotes a temperature sensor; and JSDC denotes an acceleration sensor.
Figure 18:
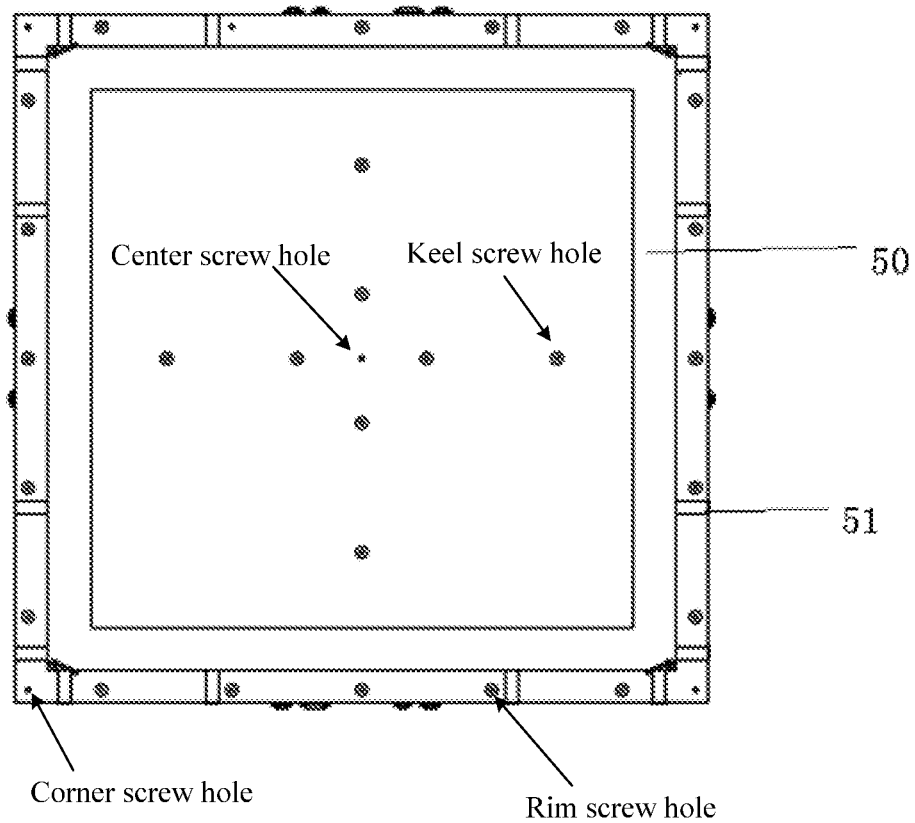
FIG. 18 is a top-surface front view illustrating a multifunctional structure for electrical energy and mechanical environment management provided by the present disclosure.

The sensors include temperature sensors for acquiring temperature inside the structure and acceleration sensors for acquiring acceleration signals inside the structure. Exemplarily installation positions of the sensors are as shown in FIG. 17. Eight temperature sensors and eight acceleration sensors are employed, and the models of these sensors are shown in Table 5.

TABLE 5

Model number and serial number of reference numeral

| Names of sensors | Models of sensors | Quantity | Reference numerals in FIG. 17 |
|---|---|---|---|
| Temperature sensor | MF501 | 8 | WDC01 to WDC08 |
| Acceleration sensor | PCB352A21 | 8 | JSDC01 to JSDC08 |

The reference numerals of the temperature sensors in FIG. 17 are WDC01 to WDC08. The temperature sensors WDC01, WDC03, WDC05 and WDC07 are bonded on the side wall of the outer surfaces of the power supply modules, while the temperature sensors WDC02, WDC04, WDC06 and WDC08 are bonded at the inner cavities of the power supply module. The sensors are connected with the outside through electrical connectors. The head of the temperature sensor is fixed by virtue of GD414 silicone rubber. A lead wire of the temperature sensor is led to the upper surface of the power supply module after being led out from the side edge of the power supply module and is connected to a 9-core electrical connector (produced by Guizhou Aerospace Electric Appliance Company, and the model number is J30JH) serving as a detection interface through a C55/0114-26 cable.

The corresponding reference numerals of the acceleration sensors are JSDC01 to JSDC08. The acceleration sensors are installed on the inner side wall of the framework and the inner surfaces of the cover plates. Six acceleration sensors are installed at the inner side of the framework. Each of the inner surface of the upper and the inner surface of the lower cover plate is provided with one acceleration sensor. Exemplary installation positions of the acceleration sensors are as follows: the acceleration sensor JSDC01 is installed on the inner side wall of a rim V, the acceleration sensor JSDC02 is installed on the inner side wall of the rim IV, the acceleration sensor JSDC03 is installed on the upper surface of the lower cover plate, the acceleration sensor JSDC04 is installed on the lower surface of the upper cover plate, the acceleration sensor JSDC05 is installed on the inner side wall of the rim I, the acceleration sensor JSDC06 is installed on the inner side wall of the rim VIII, the acceleration sensor JSDC07 is installed on the inner side wall of the rim IV, and the acceleration sensor JSDC08 is installed on the inner side wall of the rim VIII. During installation, insulation pieces are bonded first by utilizing J133 adhesive, and then the acceleration sensors are respectively bonded onto the insulation pieces through the J133 adhesive, so that shells of the installed acceleration sensors are completely insulated from a body of the multifunctional structure. Leads of the installed acceleration sensor are connected to a 9-core electrical connector (produced by Guizhou Aerospace Electric Appliance Company, and the model number is J30JH) through a C55-0114-26 cable.

Step 8: Bonding the Upper Cover Plate and a Second Elastic Cushion by Virtue of Adhesive.

The upper cover plate and the second elastic cushion are bonded together by virtue of J133 structural adhesive to form an integral structure.

Step 9: Installing the Upper Cover Plate.

Figure 20:
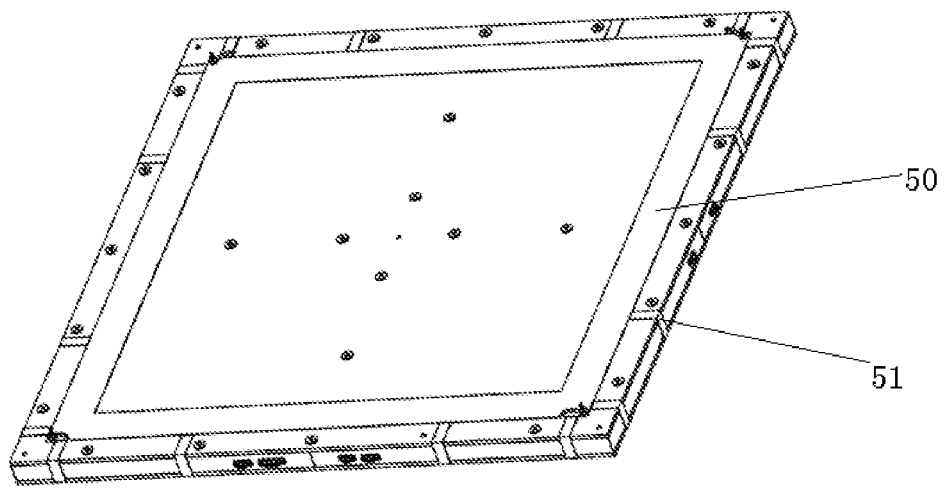
FIG. 20 is an overall perspective diagram illustrating a multifunctional structure for electrical energy and mechanical environment management provided by the present disclosure.

Screw installation holes are formed in four corner points and a central position of the framework and on the rims and keels. The upper cover plate is tightened onto the framework through screws made of titanium alloy TC-4R and corresponding plain washers and spring washers, thereby forming a complete multifunctional structure for electrical energy and mechanical environment management, and an assembled general schematic diagram thereof is shown in FIG. 20.

After the upper cover plate is installed, the second elastic cushion is also in a pre-pressed state, and the power supply modules cannot move inside the framework.

Step 10: Installing a Conducting Copper Foil and a Grounding Pile.

Figure 19:
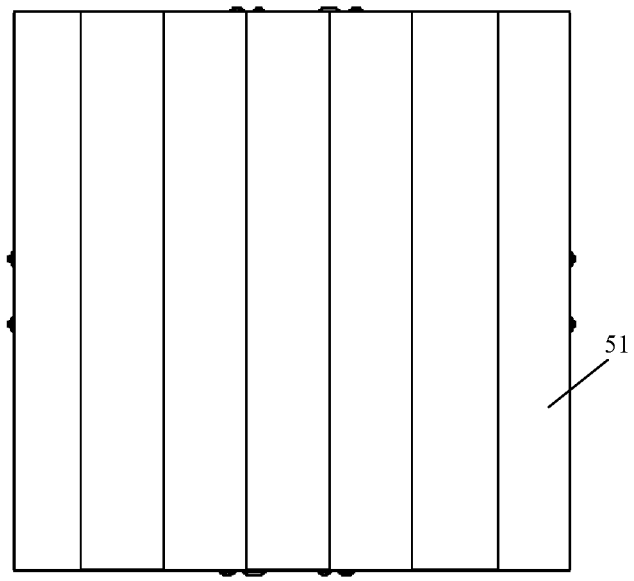
FIG. 19 is a bottom-surface front view illustrating a multifunctional structure for electrical energy and mechanical environment management provided by the present disclosure.

In order to enable the carbon fiber surface of the entire multifunctional structure to have conducting consistence, the upper surface of the upper cover plate and the lower surface of the lower cover plate are polished. Then, an copper frame (referring to FIG. 18) is laid and pasted on the upper surface of the upper cover plate; a bottom copper foil (in the present embodiment, the bottom copper foil is formed by splicing a plurality of copper foils with a width of 50 mm and forms an integral conducting surface, as shown in FIG. 19) is laid and pasted on the entire lower surface of the lower cover plate. U-shaped copper foils are uniformly laid and pasted on the side wall of the framework; and the U-shaped copper foils are in lap joint with the copper frame and the bottom copper foil (as shown in FIG. 20).

In order to enable the multifunctional structure to be effectively grounded, each of the four corners of the copper frame is connected to a grounding pile (as shown in FIG. 20). One end of the grounding pile is connected with a ground wire of the respective power supply module, and the other end is connected with a system structure ground of a spacecraft.

Figure 21:
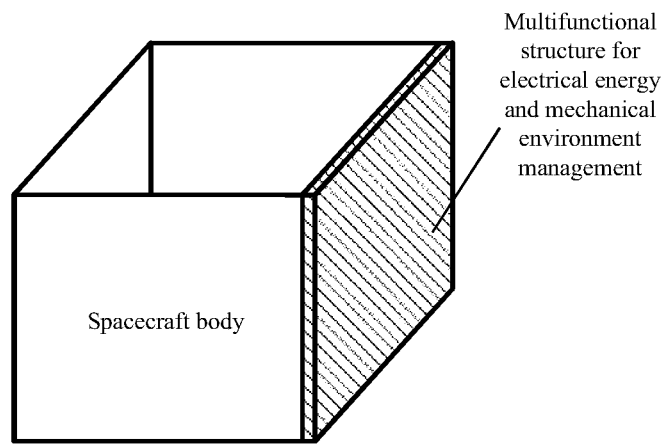
FIG. 21 is a schematic diagram illustrating a multifunctional structure serving as a spacecraft bulkhead provided by the present disclosure.

As a structure with a load bearing function, the multifunctional structure for electrical energy and mechanical environment management not only can directly replace the original spacecraft deck, but also can be used as a force bearing board structure in a spacecraft cabin. In the present embodiment, as shown in FIG. 21, the multifunctional structure serves as the deck of a spacecraft.

Figure 22:
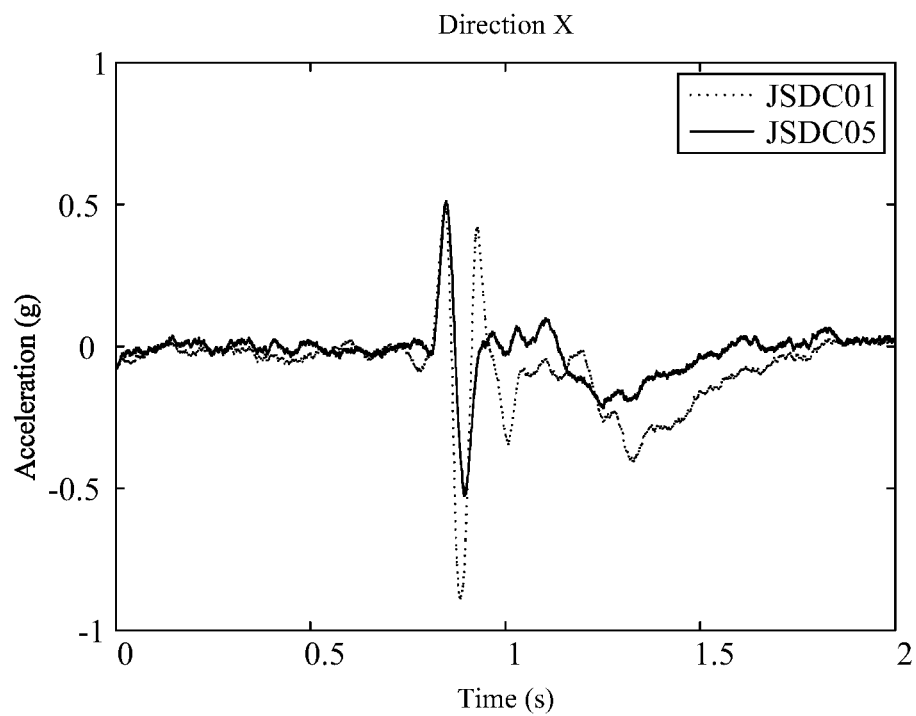
FIG. 22 is a diagram illustrating an acceleration output response of a multifunctional structure for electrical energy and mechanical environment management in an X direction.
Figure 23:
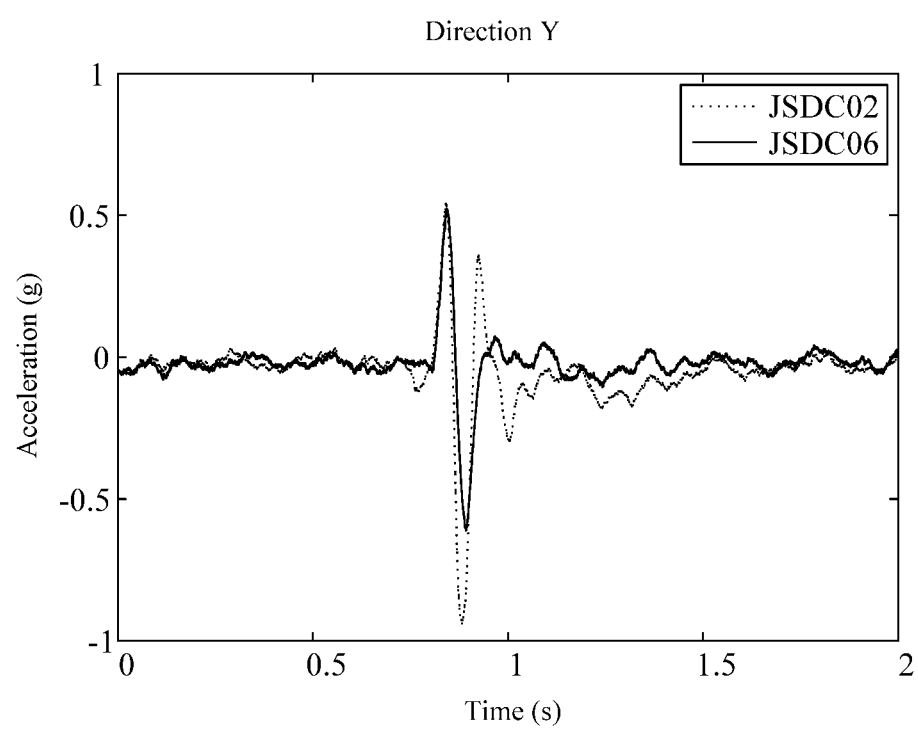
FIG. 23 is a diagram illustrating an acceleration output response of a multifunctional structure for electrical energy and mechanical environment management in a Y direction.

In order to further verify the vibration reduction effect of the present disclosure, an acceleration response test is carried out under a ground condition. As shown in FIG. 17, the rims are knocked by utilizing a hammer respectively at a point A in the X-axis direction and a point B in the Y-axis direction. Response signals of the acceleration sensors are acquired by a computer. The acceleration signals of the acceleration sensors 1 (JSDC01) and 5(JSDC05) are obtained when knocking in the X direction, as shown in FIG. 22; and the acceleration signals of the acceleration sensors 2(JSDC02) and 6(JSDC06) are obtained when knocking in the Y direction, as shown in FIG. 23. As shown in FIG. 22 and FIG. 23, a peak value of the signal of the acceleration sensor 1 is apparently greater than the peak value of the signal of the acceleration sensor 5, and the peak value of the signal of the acceleration sensor 2 is apparently greater than the peak value of the signal of the acceleration sensor 6. Therefore, it can be concluded that the vibration produced by the knocking is apparently reduced by virtue of the multifunctional structure.

In conclusion, the multifunctional structure for electrical energy and mechanical environment management provided by the present disclosure is a structure integrating the functions such as load bearing, vibration reduction, power supply and storage, measurement and the like, and the demands on the light weight and volume miniaturization of the structure can be realized.

The above only describes preferred embodiments of the present disclosure. It should be noted that for those skilled in the art, improvements and modifications can be made to the present disclosure without departing from the principle of the present invention, and these improvements and modifications should be considered to be included in the protection scope of the present disclosure.

What is claimed is:

1. A multifunctional structure for electrical energy and mechanical environment management, comprising: a main structure module, four rechargeable/dischargeable power source modules, a vibration reduction system and a sensor module, wherein the main structure module comprises a framework, an upper cover plate and a lower cover plate; the framework has an overall appearance of square shape with four square cavities arranged in two rows and two columns; the framework is in all-around symmetry about a first axis, a second axis and a third axis; the framework is sandwiched between the upper cover plate and the lower cover plate so as to seal the four square cavities; the framework, the upper cover plate and the lower cover plate form a main force bearing structure having a structure bearing function;

wherein each of the four rechargeable/dischargeable power source modules is individually arranged in a respective one of the four square cavities in an embedding manner by virtue of an elastic support; and each of four rechargeable/dischargeable power source modules is electrically connected to a first electrical connector arranged on an outer side wall of the framework via a positive wire and a negative wire of the each of four rechargeable/dischargeable power source modules;

wherein the elastic support comprises an elastic block arranged between a periphery of the rechargeable/dischargeable power source module and a wall of the respective square cavity accommodating the rechargeable/dischargeable power source module, a first elastic cushion arranged between a top surface of the rechargeable/dischargeable power source module and the upper cover plate, and a second elastic cushion arranged between a bottom surface of the rechargeable/dischargeable power source module and the lower plate;

wherein the elastic block, the first elastic cushion and the second elastic cushion form the vibration reduction system which is a spring-vibrator vibration reduction system, the elastic block, the first elastic cushion and the second elastic cushion form the elastic support with rigidity and damping; and each of the four rechargeable/dischargeable power source modules is equivalent to a vibrator with mass; the vibration reduction system absorbs vibration energy by virtue of a deformation of the elastic support, and consumes the vibration energy by a manner that the rechargeable/dischargeable power source module serving as the vibrator converts the vibration energy into kinetic energy of the vibrator; and wherein the sensor module comprises a first temperature sensor and a second temperature sensor for monitoring the temperature of the power supply modules, a first acceleration sensor for measuring a vibration condition of the framework, a second acceleration sensor for measuring a vibration condition of the upper cover plate and a third acceleration sensor for measuring a vibration condition of the lower cover plate, wherein the first temperature sensor is arranged in an inner cavity of the rechargeable/dischargeable power source module; the second temperature sensor is arranged on outer side wall of the rechargeable/dischargeable power source module; the first acceleration sensor is arranged on an inner wall of the framework; the second acceleration sensor is arranged on an inner wall of the upper cover plate and the third acceleration sensor is arranged on an inner wall of the lower cover plate.

2. The multifunctional structure for electrical energy and mechanical environment management according to claim 1, wherein the framework is formed by connecting and assembling a first hollow square pipe and a second hollow square pipe, the first hollow square pipe includes eight rims disposed on the periphery and the second hollow square pipe includes four keels disposed on the center;
the four keels are connected through a cross-shaped connector to form a cross structure;
every two of the eight rims are connected through an L-shaped connector to form an L-shaped structure firstly such that four L-shaped structures are obtained; and
the four L-shaped structures are combined with the cross structure formed by the four keels by virtue of T-shaped connectors to form the framework.

3. The multifunctional structure for electrical energy and mechanical environment management according to claim 2, wherein the four keels and the eight rims are made from layup carbon fiber composite material, and layup pattern is $[\pm45/0/\pm45]_{2s}$; and
the cross-shaped connector, the L-shaped connectors and the T-shaped connectors are made from titanium alloy material, and are bonded to the eight rims and the four keels by adhesive.

4. The multifunctional structure for electrical energy and mechanical environment management according to claim 2, wherein each corner of the framework is bonded with an L-shaped angular piece by a structural adhesive, and the angular piece is made of polyimide insulation material and used for reinforcing fitting joint locations of the framework; and an insulation piece is bonded at an installation position of each of the first acceleration sensor, the second acceleration sensor and the third acceleration sensor, and the insulation piece is made of polyimide insulation material.

5. The multifunctional structure for electrical energy and mechanical environment management according to claim 1, wherein each of the upper cover plate and the lower cover plate comprises an upper skin, a sandwiched plate and a lower skin arranged from top to bottom, and the sandwiched plate is sandwiched between the upper skin and the lower skin; the upper skin is bonded to the sandwiched plate by a first adhesive layer, a thickness of the first adhesive layer is controlled in a range from 0.1 mm to 0.2 mm; the lower skin is bonded to the sandwiched plate by a second adhesive layer, a thickness of the second adhesive layer is controlled in a range from 0.1 mm to 0.2 mm;

wherein the sandwiched plate is in a rib-grid form, the upper skin and the lower skin are respectively in a panel form, and the upper skin and the lower skin are completely identical in structural dimensions and materials; and
all of the upper skin, the sandwiched plate and the lower skin are respectively made of carbon fiber composite material, and a layup pattern for the upper skin and the lower skin is $[0/\pm45/90/\pm45]_s$; and a layup pattern for the sandwiched plate is $[0/\pm45/90/0]_{2s}$.

6. The multifunctional structure for electrical energy and mechanical environment management according to claim 1, wherein both of the upper skin and the lower skin are provided with a plurality of circular exhaust holes which are regularly distributed and serve as gas discharging passages under the conditions of technological process in ground and vacuum environment in outer space; and
the lower cover plate is fixed on the bottom surface of the framework by adhesive; the upper cover plate is fixed on the top surface of the framework by virtue of screws through threaded connection, and screw installation holes are disposed at four angular points and a central position of the framework and on the rims and keels; and the screws are made of titanium alloy materials with a predetermined heat expansion coefficient.

7. The multifunctional structure for electrical energy and mechanical environment management according to claim 1, wherein the elastic blocks, the first elastic cushions and the second elastic cushions are made of macromolecular elastic material, i.e., vinyl-terminated polydimethylsiloxane, and a chemical molecular formula of the material is:

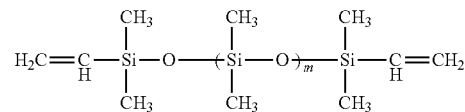

the elastic blocks, the first elastic cushions and the second elastic cushions are configured to structurally support the four rechargeable/dischargeable power source modules, consume the vibration energy by virtue of deformation, protect the four rechargeable/dischargeable power source modules, enable the four rechargeable/dischargeable power source modules to be insulated from the main structure module and dissipate the heat of the four rechargeable/dischargeable power source modules.

8. The multifunctional structure for electrical energy and mechanical environment management according to claim 1, wherein the elastic block, the first elastic cushion and the second elastic cushion are installed in a pre-pressing manner, and the four rechargeable/dischargeable power source modules are elastically constrained and supported by virtue of an elastic force produced by the pre-pressing; the elastic block is in a cuboid shape; two ends of the elastic block are respectively connected with an inner side surface of the framework and an outer side surface of the power supply module in a surface contact manner but are not fixed connected to the inner side surface of the framework and the outer side surface of the power supply module; each of the first elastic cushion and the second elastic cushion is in parallel crosses; one surface of the first elastic cushion is bonded with the lower surface of the upper cover plate through adhesive, another surface of the first elastic cushion is connected with the top surface of the power supply module in a surface contact manner but not fixed connected to the top surface of the power supply module; one surface of the second elastic cushion is bonded with the upper surface of the lower cover plate through adhesive, another surface of the second elastic cushion is connected with the bottom surface of the power supply module in a surface contact manner but not fixed connected to the bottom surface of the power supply module; each of the elastic block, the first elastic cushion and the second elastic cushion is in a pre-pressed state once installed, such that each of the four power supply modules is at a predetermined position inside the framework when the each of the four power supply modules is in a stationary state.

9. The multifunctional structure for electrical energy and mechanical environment management according to claim 1, wherein, at an inner side of the framework, each elastic block is adhered with a first limiting block at a first root boundary at a first side of the elastic block by a first structural adhesive and a second limiting block at a second root boundary at a second side of the elastic block by a second structural adhesive, the first limiting block and the second limiting block are configured to prevent the elastic block from moving and dislocating.

10. The multifunctional structure for electrical energy and mechanical environment management according to claim 1, wherein each of the four rechargeable/dischargeable power source modules includes a lithium battery.

11. The multifunctional structure for electrical energy and mechanical environment management according to claim 1, wherein a plurality of voltage detection wires are led out from each of the four rechargeable/dischargeable power source modules and welded on a second electrical connector installed on the outer side wall of the framework to form a detection interface for detecting a grading voltage signal of the each of the four rechargeable/dischargeable power source modules.

12. The multifunctional structure for electrical energy and mechanical environment management according to claim 1,
   wherein both the upper surface of the upper cover plate and the lower surface of the lower cover plate are polished, so that a carbon fiber surface of the multifunctional structure is consistent in conductivity;
   wherein an copper frame is laid and pasted on the upper surface of the upper cover plate; a bottom copper foil is laid and pasted on the lower surface of the lower cover plate, and the bottom copper foil is formed by splicing a plurality of copper foils with a first width so as to form an integral conducting surface; U-shaped copper foils are uniformly laid and pasted on the outer side wall of the framework, and the U-shaped copper foils are connected with the copper frame on the upper cover plate and the bottom copper foil on the lower cover plate, so that the multifunctional structure is consistent in conductivity; and
   a grounding pile is installed at each of four corners of the copper frame; one end of the grounding pile is connected with a ground wire of a respective power supply module, and the other end of the grounding pile is connected with an external ground, the multifunctional structure is integrally and effectively grounded via the grounding pile.

13. The multifunctional structure for electrical energy and mechanical environment management according to claim 10, wherein a plurality of voltage detection wires are led out from each of the four rechargeable/dischargeable power source modules and welded on a second electrical connector installed on the outer side wall of the framework to form a detection interface for detecting a grading voltage signal of the each of the four rechargeable/dischargeable power source modules.

14. The multifunctional structure for electrical energy and mechanical environment management according to claim 10,
   wherein both the upper surface of the upper cover plate and the lower surface of the lower cover plate are polished, so that a carbon fiber surface of the multifunctional structure is consistent in conductivity;
   wherein an copper frame is laid and pasted on the upper surface of the upper cover plate; a bottom copper foil is laid and pasted on the lower surface of the lower cover plate, and the bottom copper foil is formed by splicing a plurality of copper foils with a first width so as to form an integral conducting surface; U-shaped copper foils are uniformly laid and pasted on the outer side wall of the framework, and the U-shaped copper foils are connected with the copper frame on the upper cover plate and the bottom copper foil on the lower cover plate, so that the multifunctional structure is consistent in conductivity; and
   a grounding pile is installed at each of four corners of the copper frame; one end of the grounding pile is connected with a ground wire of a respective power supply module, and the other end of the grounding pile is connected with an external ground, the multifunctional structure is integrally and effectively grounded via the grounding pile.

15. The multifunctional structure for electrical energy and mechanical environment management according to claim 11,
   wherein both the upper surface of the upper cover plate and the lower surface of the lower cover plate are polished, so that a carbon fiber surface of the multifunctional structure is consistent in conductivity;
   wherein an copper frame is laid and pasted on the upper surface of the upper cover plate; a bottom copper foil is laid and pasted on the lower surface of the lower cover plate, and the bottom copper foil is formed by splicing a plurality of copper foils with a first width so as to form an integral conducting surface; U-shaped copper foils are uniformly laid and pasted on the outer side wall of the framework, and the U-shaped copper foils are connected with the copper frame on the upper cover plate and the bottom copper foil on the lower cover plate, so that the multifunctional structure is consistent in conductivity; and
   a grounding pile is installed at each of four corners of the copper frame; one end of the grounding pile is connected with a ground wire of a respective power supply module, and the other end of the grounding pile is connected with an external ground, the multifunctional structure is integrally and effectively grounded via the grounding pile.

16. The multifunctional structure for electrical energy and mechanical environment management according to claim 13,
   wherein both the upper surface of the upper cover plate and the lower surface of the lower cover plate are polished, so that a carbon fiber surface of the multifunctional structure is consistent in conductivity;
   wherein an copper frame is laid and pasted on the upper surface of the upper cover plate; a bottom copper foil is laid and pasted on the lower surface of the lower cover plate, and the bottom copper foil is formed by splicing a plurality of copper foils with a first width so as to form an integral conducting surface; U-shaped copper foils are uniformly laid and pasted on the outer side wall of the framework, and the U-shaped copper foils are connected with the copper frame on the upper cover plate and the bottom copper foil on the lower cover plate, so that the multifunctional structure is consistent in conductivity; and a grounding pile is installed at each of four corners of the copper frame; one end of the grounding pile is connected with a ground wire of a respective power supply module, and the other end of the grounding pile is connected with an external ground, the multifunctional structure is integrally and effectively grounded via the grounding pile.

* * * * *